J. LEHMANN & M. WOLTEK.
HOSE COUPLING.
APPLICATION FILED NOV. 2, 1910.
994,762.
Patented June 13, 1911.
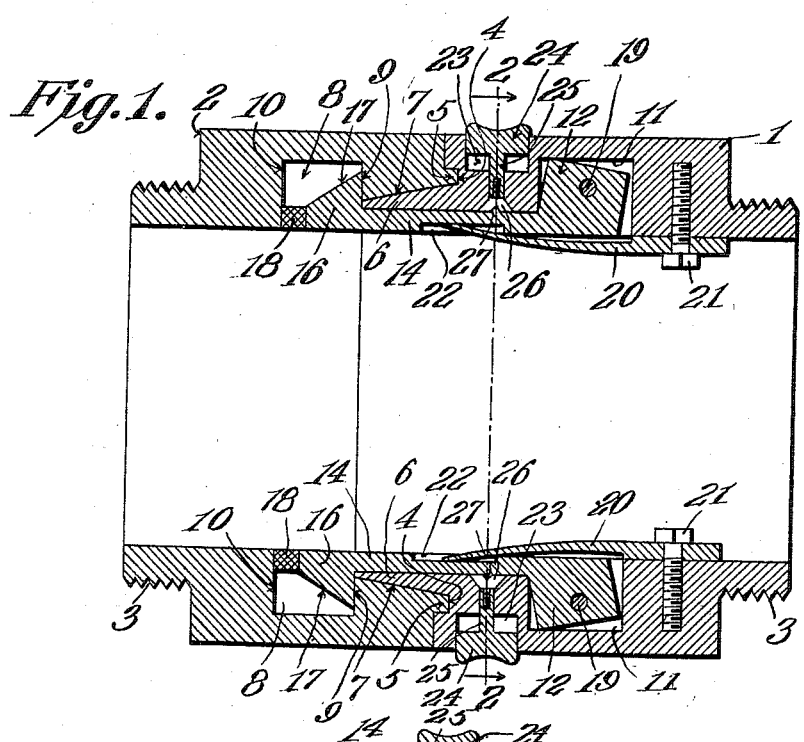
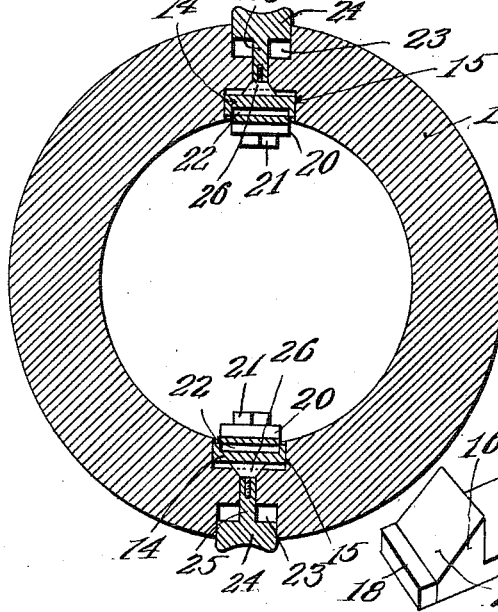
Witnesses
Frank B. Worden.
Mason B. Lawton
John Lehmann and Mathias Woltek Inventors,
by C. A. Snow & Co.
Attorneys.

UNITED STATES PATENT OFFICE.

JOHN LEHMANN AND MATHIAS WOLTEK, OF WELLSVILLE, NEW YORK.

HOSE-COUPLING.

994,762.　　　　　Specification of Letters Patent.　Patented June 13, 1911.

Application filed November 2, 1910. Serial No. 590,344.

*To all whom it may concern:*

Be it known that we, JOHN LEHMANN and MATHIAS WOLTEK, citizens of the United States, residing at Wellsville, in the county of Allegany, State of New York, have invented a new and useful Hose-Coupling, of which the following is a specification.

It is the object of this invention to provide a hose coupling which may readily be united, without rotating the component elements of the coupling, the elements of the coupling being adapted to be slid together, and to interlock automatically.

Another object of the invention is to provide novel means for holding the component elements of the coupling together, and to provide novel means for holding the constituent elements of the structure in proper, operative relation with respect to each other.

The drawings show typical embodiments merely, and it to be understood that changes, properly falling within the scope of what is claimed, may be made without departing from the spirit of the invention.

In the drawings, Figure 1 shows the invention in longitudinal section; Fig. 2 is a transverse section on the line 2—2 of Fig. 1; and Fig. 3 is a detail perspective of the latch.

The invention includes a primary member 1, and a secondary member 2, both tubular in structure, and threaded at their remote ends, as shown at 3, or otherwise constructed so as to receive and hold the meeting ends of two sections of hose. The primary section 1 is recessed in its end face, as shown at 4, to receive a tongue 5, outstanding from the end face of the secondary section 2. The end of the primary section 1 is tapered, as shown at 6, to fit in the conical bore 7 of the secondary section 2. In the interior of the secondary section 2, are oppositely disposed recesses 8, defining shoulders 9 and 10. In the primary section 1, are oppositely disposed chambers 11, adapted to receive the butts 12 of latches, the shanks 14 of which extend longitudinally of the primary section 1, in the interior thereof, the shanks 14 of the latches registering in grooves 15 in the primary section 1. At their outer edges, the latches are provided with heads 16, adapted to engage the shoulders 9 of the secondary section 2, to hold the members 1 and 2 together, the butts 12 of the latches being pivotally mounted upon pins 19 extending transversely of the chambers 11, and terminally mounted in the primary member 1. The remote faces of the heads 16 of the latches are inclined, as shown at 17 and resilient tips 18 may be mounted upon the ends of the latches, these tips being adapted to be compressed against the shoulders 10, as seen clearly in Fig. 1.

Spring plates 20 are provided, these spring plates being secured by means of screws 21 or the like, to the primary section 1. The spring plates 20 extend longitudinally of the coupling, their free ends registering slidably in grooves 22 in the inner faces of the shanks 14 of the latches. Although the ends of the spring plates 20 are free to slide longitudinally of the grooves in the latches, these grooves are of substantially the same width as the springs 20, and by this construction, it will be seen that when the ends of the springs 20 are seated in the grooves 22, the springs 20 cannot move laterally upon the retaining member 21. Thus, the spring plates 20 are at all times maintained in proper relation with respect to the latches which they actuate.

In the outer face of the primary section 1, are oppositely disposed seats 23. Push buttons are included in the structure, these push buttons comprising plates 24 and integrally formed shanks 25, the plates 24 registering in the seats 23 against rotation. The push buttons further include heads 26, which are threaded into the shanks 25. These heads 26 of the push buttons are provided with kerfs. Upon the shanks 14 of the latches are transverse ribs 27 adapted to register in the kerfs.

In practical operation, the inclined face 17 of the latch will engage the tapered bore 7 of the secondary member 2, forcing the free ends of the latches inwardly, against the action of the spring plates 20. The spring plates 20 will, however, when the members 1 and 2 are brought together, serve to actuate the heads 16 of the latches into engagement with the shoulder 9 of the secondary member 2, as shown in Fig. 1 of the drawings, thus holding the primary member 1 and the secondary member 2 firmly together. Therefore, in order to unite two sections of hose or pipe, it is necessary merely to thrust the end of the primary member into the end of the secondary member 2, the members 1 and 2 automatically locking together. As hereinbefore pointed out, owing to the fact that the free end of the spring 20 is engaged in the grooves 22 of the latch, the spring plate 20 cannot swing laterally; thus the spring is held at all times in a position operative to actuate the latch.

The component parts of the push button may be separated by unscrewing the head 26 from the shank 25. This head 26 serves to hold the push button in place within the primary member 1. However, by reason of the fact that the rib 27 which is upon the shank 14 of the latch, registers in the kerf of the head 26, the head 26 is prevented from rotating in the shank 25 of the push button and thus the parts of the push button are held together, the plate portion 24 of the push button being held within the seat 23 provided for its reception.

Having thus described the invention, what is claimed is:—

1. A coupling comprising a primary member and a secondary member; a latch pivoted to the primary member and adapted to engage the secondary member to hold the members assembled; resilient means for actuating the latch to engage the secondary member; and a push button slidable in the primary member to move the latch out of engagement with the secondary member, the button consisting of removably connected parts, one of which engages the primary member against rotation, and the other of which engages the primary member to prevent the withdrawal of the button, the last named part and the latch being provided with interengaging elements to hold said parts against rotation with respect to the other part.

2. A coupling comprising a primary member and a secondary member; a latch pivoted in the primary member and adapted to engage the secondary member to hold the members assembled; a spring plate disposed within the primary member and bearing at one end against the latch to actuate the latch to engage the secondary member; a connecting element uniting the other end of the plate with the primary member; there being a longitudinal groove in the latch adapted to receive the end of the plate slidably; and to prevent the plate from tilting laterally upon the connecting element; and means operable from the exterior of the primary member for tilting the latch out of engagement with the secondary member.

In testimony that we claim the foregoing as our own, we have hereto affixed our signatures in the presence of two witnesses.

JOHN LEHMANN.
MATHIAS WOLTEK.

Witnesses:
OTTA LEHMANN,
FRANK ARNOLD.

---

Copies of this patent may be obtained for five cents each, by addressing the "Commissioner of Patents, Washington, D. C."